(12) United States Patent
Arai

(10) Patent No.: US 12,115,893 B2
(45) Date of Patent: Oct. 15, 2024

(54) HEADREST BRACKET AND SEAT HEADREST

(71) Applicant: Guangzhou Arai Auto Parts CO., LTD, Guangzhou (CN)

(72) Inventor: Tokuji Arai, Guangzhou (CN)

(73) Assignee: Guangzhou Arai Auto Parts CO., LTD, Guangzhou (CN)

( * ) Notice: Subject to any disclaimer, the term of this patent is extended or adjusted under 35 U.S.C. 154(b) by 144 days.

(21) Appl. No.: 17/994,251

(22) Filed: Nov. 25, 2022

(65) Prior Publication Data

US 2023/0158933 A1 May 25, 2023

(30) Foreign Application Priority Data

Nov. 25, 2021 (CN) .......................... 202122914265.0

(51) Int. Cl.
| | |
|---|---|
| *B60N 2/68* | (2006.01) |
| *B21D 39/04* | (2006.01) |
| *B60N 2/80* | (2018.01) |
| *B60N 2/809* | (2018.01) |
| *B60N 2/897* | (2018.01) |

(52) U.S. Cl.
CPC ..................... *B60N 2/80* (2018.02)

(58) Field of Classification Search
CPC ............. B21D 39/04; B60N 2/68; B60N 2/80
See application file for complete search history.

(56) References Cited

U.S. PATENT DOCUMENTS

| | | | | |
|---|---|---|---|---|
| 4,738,809 | A * | 4/1988 | Storch ................... | B29C 33/126 264/161 |
| 5,927,814 | A * | 7/1999 | Yoshimura ............... | B60N 2/80 297/391 |
| 5,934,755 | A * | 8/1999 | Halamish ............... | B60N 2/818 297/391 |
| 6,224,158 | B1 * | 5/2001 | Hann ..................... | B60N 2/809 297/391 |
| 7,537,282 | B2 * | 5/2009 | Veine ..................... | B60N 2/888 297/216.12 |
| 7,954,893 | B2 * | 6/2011 | Yokota ................. | B60N 2/4228 297/216.12 |
| 8,356,863 | B2 * | 1/2013 | Arcidiacone ........ | B21D 49/005 297/391 |
| 8,539,661 | B2 * | 9/2013 | Gross ....................... | B60N 2/68 29/DIG. 48 |
| 10,179,433 | B2 * | 1/2019 | Dry ......................... | B29C 49/70 |
| 2010/0244538 | A1 * | 9/2010 | Gross ....................... | B60N 2/68 29/401.1 |
| 2010/0270834 | A1 * | 10/2010 | Niitsuma ............... | B60N 2/682 297/216.12 |
| 2011/0031795 | A1 * | 2/2011 | Arcidiacone .......... | B21D 17/02 297/391 |
| 2015/0042142 | A1 * | 2/2015 | Hesterberg ............. | B60N 2/809 297/391 |
| 2015/0239377 | A1 * | 8/2015 | Winkelbach ............. | B60N 2/80 297/391 |

(Continued)

*Primary Examiner* — Shin H Kim

(57) ABSTRACT

A headrest support and a seat headrest in which the headrest support has a U shape and is configured for supporting a headrest. The headrest support includes an inner tube and an outer tube. The outer tube covers at least two end portions of the inner tube. The outer tube is secured to the inner tube by laser brazing.

11 Claims, 6 Drawing Sheets

(56) References Cited

U.S. PATENT DOCUMENTS

| | | | | |
|---|---|---|---|---|
| 2023/0125737 A1* | 4/2023 | Maire | ............... | B60N 2/7017 |
| | | | | 297/391 |
| 2023/0158933 A1* | 5/2023 | Arai | ................ | B60N 2/897 |
| | | | | 297/391 |

* cited by examiner

HEADREST BRACKET AND SEAT HEADREST

TECHNICAL FIELD

The present disclosure relates to a headrest support and a seat headrest.

BACKGROUND

In a vehicular seat, the headrest and the seat backrest are often manufactured separately and assembled. In the installation of the headrest to the seat backrest, a support is used for connection and fixation. Usually the support is an integral piece of metal tube, such as an iron tube member or stainless steel tube member that is formed in one piece. Further, in consideration of anti-rusting performance and good appearance, at least the lower portion of the support needs to undergo a plating process.

SUMMARY

In such a support formed by an integral piece of metal tube, to ensure necessary support strength, usually the tube is provided to have a large thickness, which causes an increase in the overall weight of the support because a large amount of material is required. Furthermore, at least the lower portion of the support needs to undergo a plating process, leading to relatively high processing costs, high complexity and great difficulty of the processing steps.

The object of the present disclosure is to provide a headrest support capable of significantly reducing the weight of the support while reducing the processing costs, the complexity and difficulty of the processing steps. The support is formed by the two types of tubes of an inner tube and an outer tube. By providing proper wall thickness, length and shape of the two tubes, it is possible to provide only a portion requiring high strength to have a dual-layer structure; and it is possible to provide only the outer tube with a high anti-rusting requirement to be made of a material of high anti-rusting performance and/or undergone anti-rusting treatment.

The headrest support of the present disclosure has a U shape (including a substantially U shape) and is configured for supporting the headrest. The headrest support includes an inner tube and an outer tube. The outer tube covers at least two end portions of the inner tube. The outer tube is secured to the inner tube by laser brazing. A length of a welded portion of the laser brazing is set to a length enabling the headrest to bear a pressure from a head as being leaned against.

In the above headrest support, the welded portion of the laser brazing is formed on each of the two end portions of the inner tube and an end portion or end portions of the outer tube.

In the above headrest support, the inner tube has undergone galvanization.

In the above headrest support, the inner tube is formed by iron, and the outer tube is formed by stainless steel.

In the above headrest support, the headrest support is comprised of one inner tube and two outer tube covering two end portions of the inner tube, respectively.

Further, the present disclosure provides a seat headrest, including a headrest portion and a headrest support. The headrest support has an embedded portion embedded in an interior of the headrest portion and an insertion portion exposed to an exterior of the headrest portion and to be inserted into a vehicular seat backrest.

The headrest support may have a U shape and include an inner tube, and an outer tube covering at least two end portions of the inner tube. The outer tube may be secured to the inner tube by laser brazing. A length of a welded portion of the laser brazing may be set to a length enabling the headrest to bear a pressure from a head as being leaned against.

In the above seat headrest, the insertion portion is completely enclosed by the outer tube.

The headrest support according to the present disclosure is formed by an inner tube and an outer tube; and the outer tube is secured to the inner tube by laser brazing. As such, it is possible to provide only a portion requiring high strength to have a dual-layer structure, satisfying the necessary strength while significantly reducing the weight of the headrest support; and it is possible to provide only the outer tube with a high anti-rusting requirement to be made of a material of high anti-rusting performance and/or undergone anti-rusting treatment. Furthermore, the outer tube completely encloses and isolates the inner tube, thereby realizing rusting prevention for the support while achieving a good effect in saving the materials and simplifying the production process.

DETAILED DESCRIPTION

Figure 1:
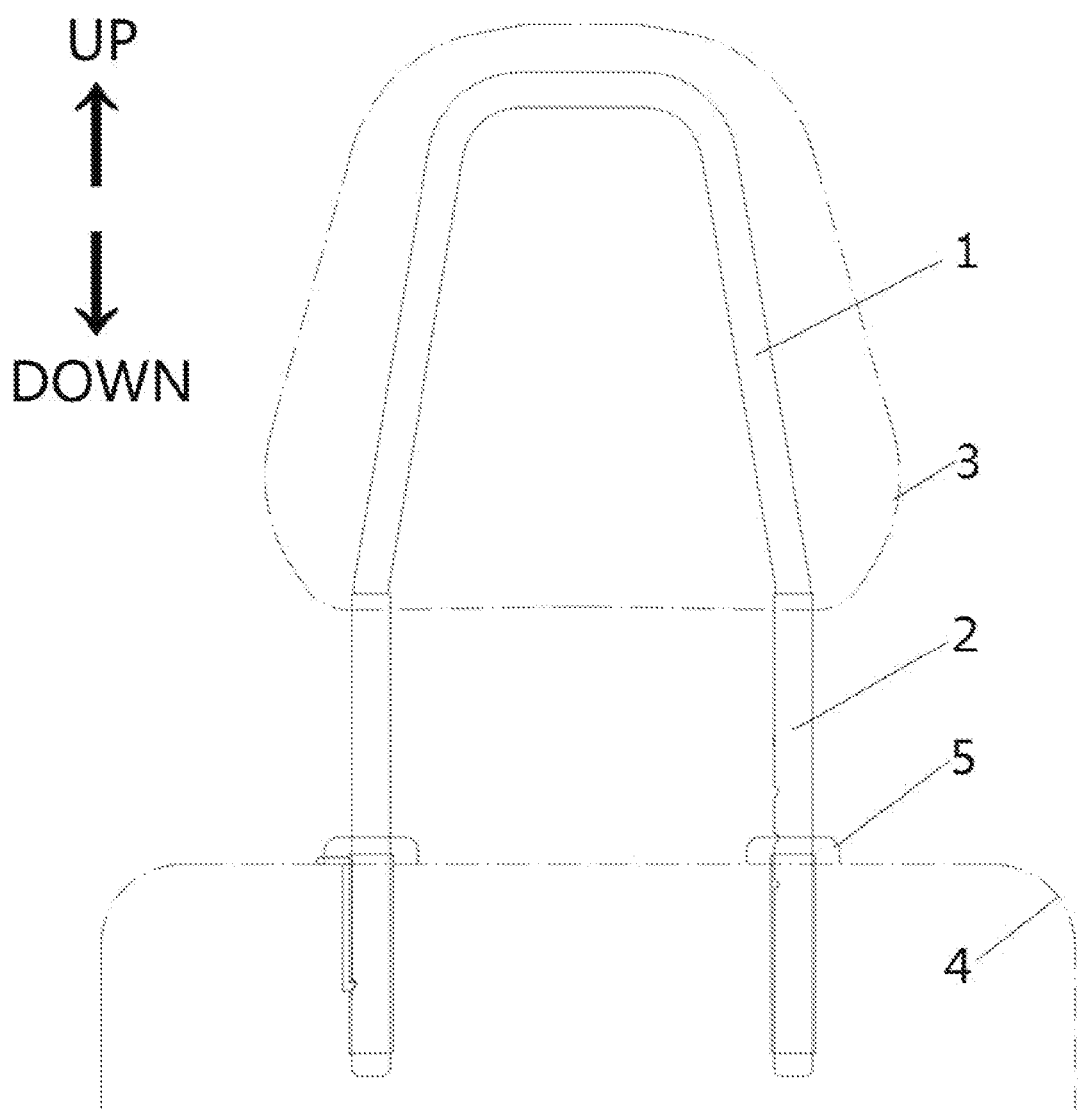
FIG. 1 is a front view of a state where a headrest portion is secured to a seat backrest using the headrest support of the present disclosure.

As shown in FIG. 1, a headrest portion 3 of a vehicular seat is secured to a seat backrest 4 by the substantially U-shaped headrest support formed by an inner tube 1 and one or two outer tubes 2. The inner tube 1 is bent to a U shape at a substantially middle portion thereof, with its two free ends 1a towards the same direction. The two outer tubes 2 are fixed to the two free ends 1a of the inner tube 1, respectively. Here, the term "U shape" refers to not only the shape that is substantially the shape of the letter "U"; the shape that the two end portions extend towards the same direction and the more complex design of the middle portion in view of the requirements for the strength, the supporting effect, and the like are also included in the scope of the concept of the "U shape" mentioned in the present disclosure. In the accompanying drawings of the present disclosure, the direction towards above is determined as "up"; the direction towards below is determined as "down".

After the headrest portion 3 is assembled to the inner tube 1, the headrest portion 3 is secured to the seat backrest 4 via the headrest support such that the inner tube 1 is in a form with the opening of the U shape faces downwards. The headrest support, more accurately the outer tube 2, is secured to the seat backrest 4 by the holder 5.

Figure 2:
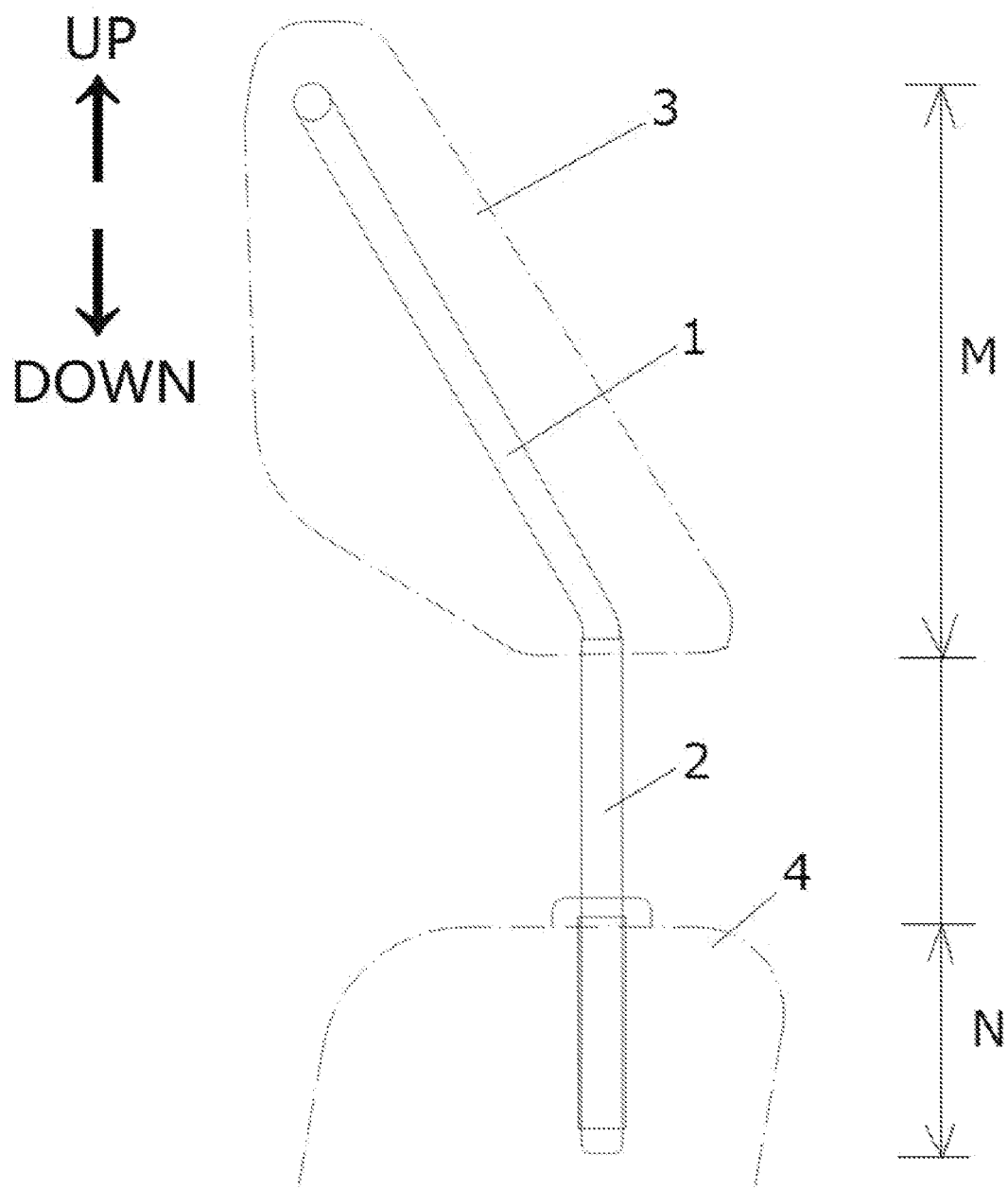
FIG. 2 is a side view of the state shown in FIG. 1.

FIG. 2 is a side view of the state where the headrest portion 3 is secured to a seat backrest 4 using the headrest support of the present disclosure. As shown in FIG. 2, in the up-down direction, the headrest support includes a portion M inserted into the headrest portion 3 and a portion N inserted in to the seat backrest 4. In the sectional view of FIG. 2, the inner tube 1 is inclined in relation to the outer tube 2 at an angle towards the front of the seat such that a seated passenger feels comfortable when leaning his/her head against the headrest portion 3.

Figure 3:
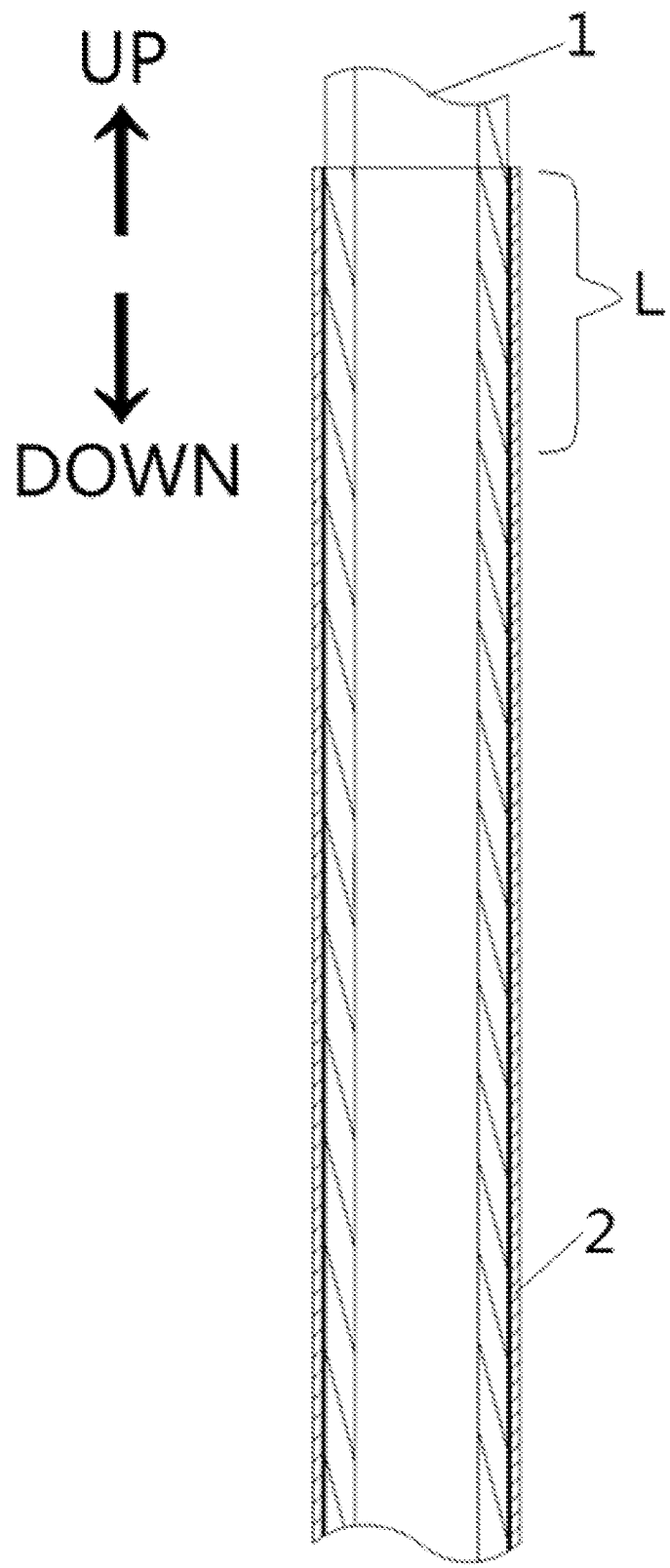
FIG. 3 is a sectional view of a region where an end (upper end) of the outer tube of the headrest support according to the present disclosure comes into contact with the inner tube.

Further, a diameter of the inner tube 1 is smaller than a diameter of the outer tube 2, so that the inner tube 1 is insertable into the outer tube 2. At one end of the outer tube 2, such as the upper end as shown in FIG. 3, a region for connecting with the inner tube 1 is formed. In this region, the inner tube 1 can be welded and secured to the outer tube 2. This region is denoted as welded portion L. A length of the welded portion L is set to be a length enabling the headrest to bear the pressure from the head when the headrest is leaned against.

Figure 4:
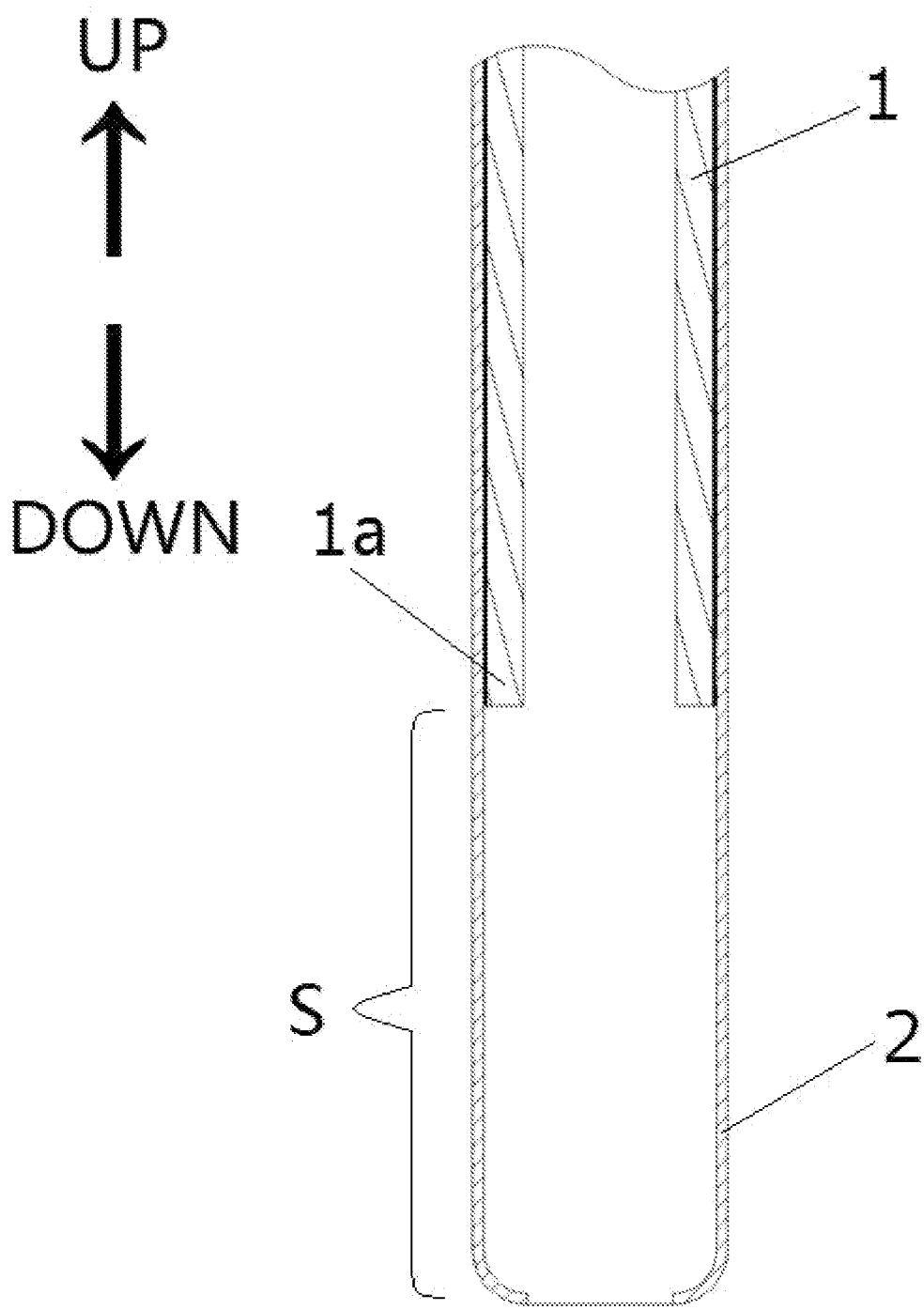
FIG. 4 is a sectional view of a region where the other end (lower end) of the outer tube of the headrest support according to the present disclosure comes into contact with the inner tube.

FIG. 4 is a sectional view of the region where the other end (lower end) of the outer tube of the headrest support according to the present disclosure comes into contact with the inner tube 1. Considering lightening the weight and saving materials, in a state that the inner tube 1 is inserted to be assembled to the outer tube 2 and that they are welded together at the welded portion L for example by welding, there is a single-layer region at the lower end of the outer tube 2 where only the outer tube 2 is present; that is, a single-layer portion S where only the outer tube 2 is present is formed between the free end 1a of the inner tube 1 and the lower end portion of the outer tube 2. The length of the single-layer portion S is set to be capable of ensuring, when the headrest support is installed in the seat backrest 4, a securing strength therebetween. The whole of the outer tube 2 except the single-layer portion S forms a dual-layer structure with the inner tube 1. In other words, according to the required strength of the supporting portion, by forming a structural combination with the optimal wall thickness, it is possible to significantly reduce the weight of the support by using dual tubes at a portion requiring strength while using a single tube at the other portions.

In addition, connecting the outer tube 2 with the inner tube 1 by a method such as welding can reinforce the outer tube 2 and the inner tube 1 at the welded portion L. The welding is preferably laser brazing, because the brazing material can thereby fully fill in the gaps and realize integral connection around the whole periphery of the outer tube 2 and inner tube 1, achieving better seal and firm connection between the outer tube 2 and the inner tube 1. In addition, preferably the brazing is performed at the end portion of the outer tube 2 to completely close the outer tube 2 from the end portion, which is favorable for preventing rusting in the interior of the tube.

As to the materials, it is possible that the inner tube 1 is made of iron and the outer tube 2 is made of stainless steel. Further, the inner tube 1 may be subjected to local or overall galvanization to further improve the anti-rusting effect. Since the outer tube 2 is a stainless steel, it may save the plating. Moreover, based on the structure of the inner and outer tubes, an advantage is obtained in terms of the cost for the materials: the inner tube 1 is sealed by being enclosed by the outer tube 2 and the brazing, and is thus prevented from rusting; thus, it may use merely an iron material, and may not be subjected to plating. This enables saving the cost for the materials as compared with the past situation where stainless steel is used for the whole structure.

Figure 5:
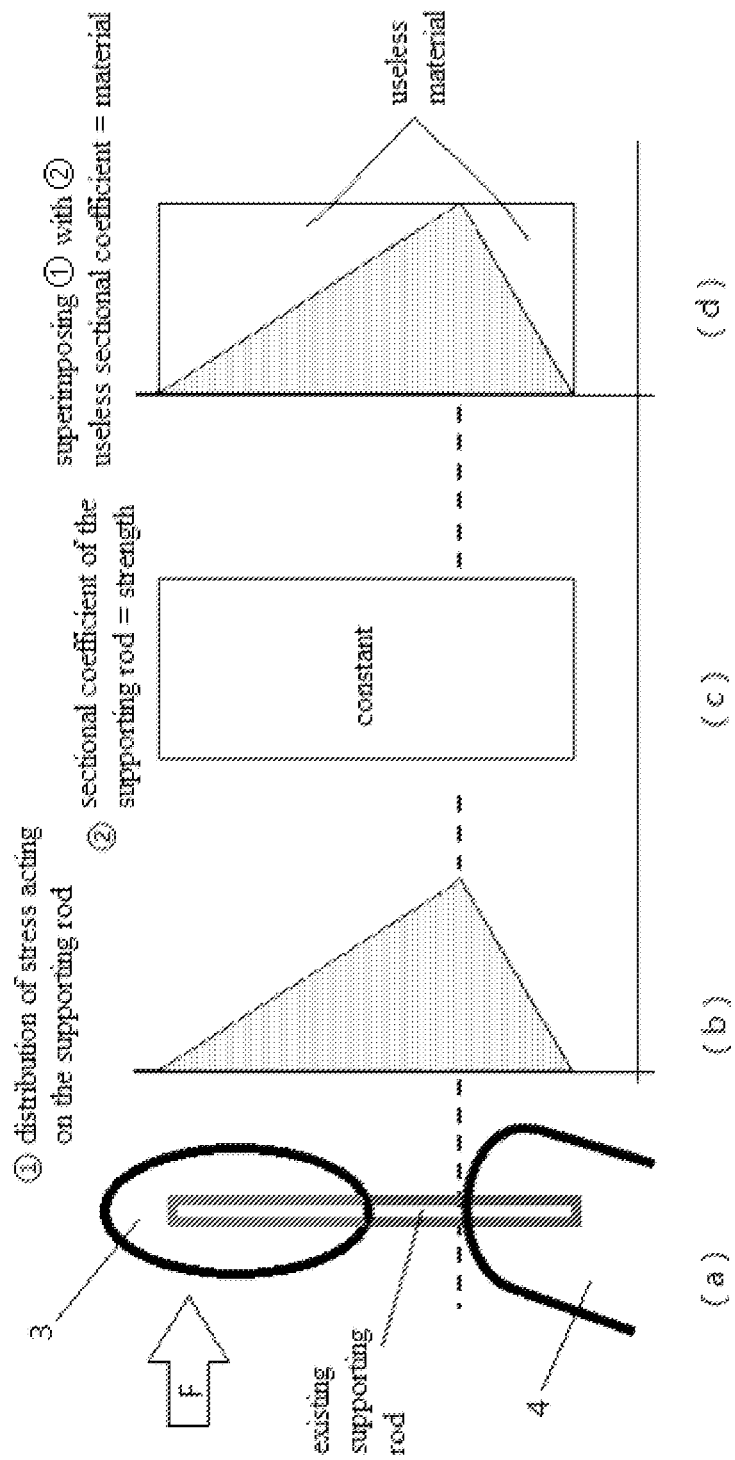
FIG. 5 is a diagram illustrating distribution of stress of existing single-layer supporting rod in use.
Figure 6:
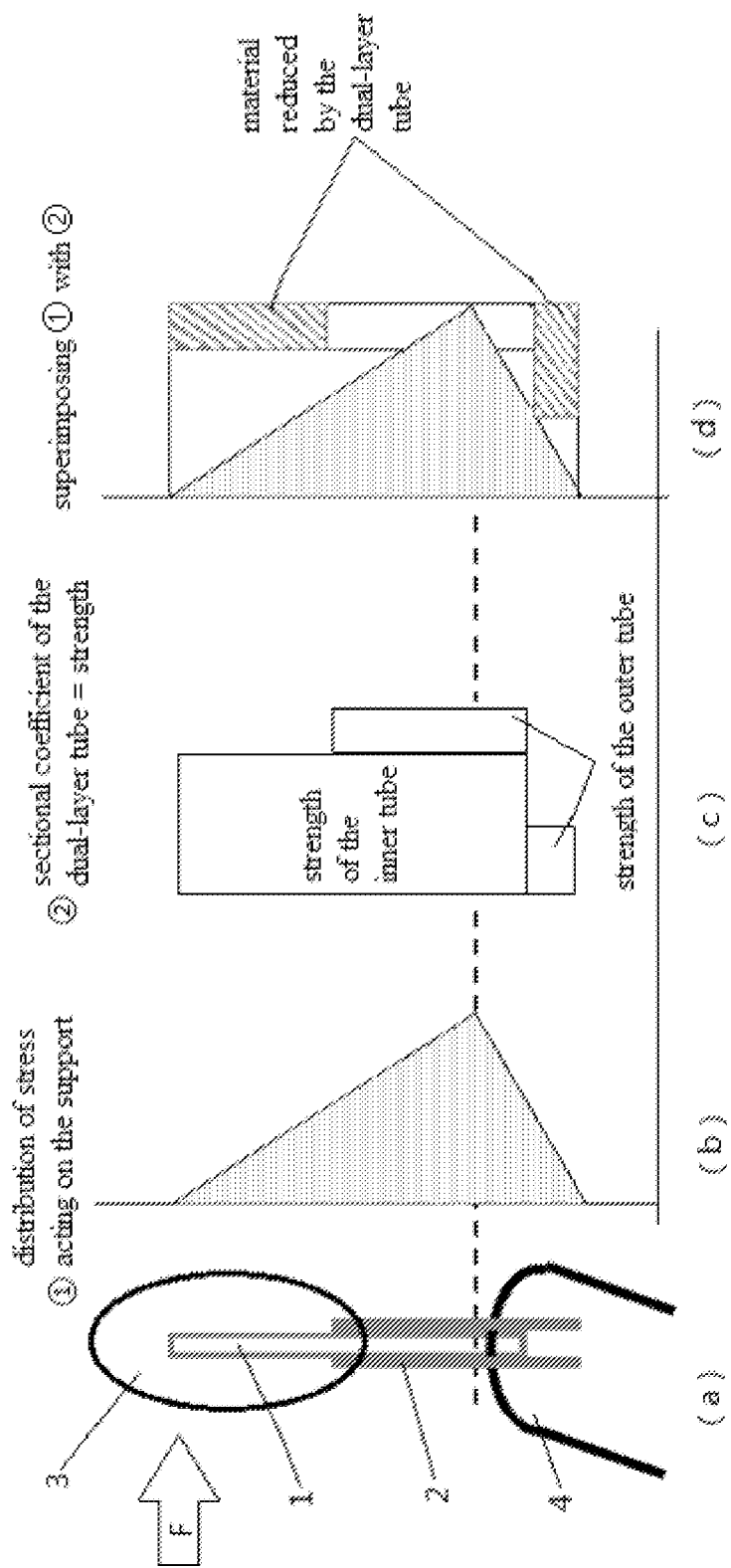
FIG. 6 is a diagram illustrating distribution of stress of the dual-layer headrest support of the present disclosure in use.

Referring to FIGS. 5 and 6, the strength in use of the headrest support with the dual-layer tube structure is described. FIG. 5 shows a situation where a single-layer tube is used. When the headrest portion 3 is subjected to a force F from the head of the passenger as shown in part (a) of FIG. 5, distribution of the stress acting on the supporting rod is as shown in part (b) of FIG. 5, reaching a peak value at the contact point between the supporting rod and the seat backrest and decreasing gradually towards the upper and lower sides. Part (c) of FIG. 5 illustrates the sectional coefficient of the supporting rod i.e. strength, of which the value remains constant over the length range of the entire supporting rod. Part (d) of FIG. 5 is obtained by superimposing part (b) of FIG. 5 onto part (c) of FIG. 5. It can be seen that, as the strength value of the supporting rod meets the applied force, a superfluous difference value is generated, i.e., the two triangular areas in part (d) of FIG. 5, in which the strength of the supporting rod does not play a role.

FIG. 6 is an analysis diagram illustrating the applied force and the strength of each part of the headrest support formed with the dual-layer tube according to the present disclosure. When the headrest portion 3 is subjected to the force F from the head of the passenger as shown in part (a) of FIG. 6, similar to the situation shown in part (a) of FIG. 5, distribution of the stress acting on the headrest support is as shown in part (b) of FIG. 6, reaching a peak value at the contact point between the headrest support and the seat backrest and decreasing gradually towards the upper and lower sides. Part (c) of FIG. 6 shows the strength distribution of the dual-layer tube structure formed by the inner tube 1 and the outer tube 2. The total strength of the dual-layer tube meets the requirement of the force F. As compared with the single-layer tube structure of FIG. 5, the strength requirements for the two rectangular areas shown in part (d) of FIG. 6 can be saved, thereby enabling reduction of a corresponding amount of the used materials.

As an example, a weight comparison between the headrest support with the dual-layer tube structure according to the present disclosure and an iron supporting rod with the existing single-layer structure is shown in the following tables.

TABLE 1

(Front Seat Support)

| | outer diameter (mm) | wall thickness (mm) | full length (mm) | weight (g) | difference in weight (g) | light-weighting degree |
|---|---|---|---|---|---|---|
| inner tube (iron) | 12.7 | 1.6 | 760 | 333 | −77 | −16% |
| outer tube (stainless steel) | 14.0 | 0.6 | 320 | 63 | | |
| dual-layer tube according to the present disclosure | | | | 396 | | |
| existing iron supporting rod | 14.0 | 2.0 | 800 | 473 | | |

TABLE 2

| | (rear seat support) | | | | | |
|---|---|---|---|---|---|---|
| | outer diameter (mm) | wall thickness (mm) | full length (mm) | weight (g) | difference in weight (g) | light-weighting degree |
| inner tube (iron) | 12.7 | 1.2 | 660 | 225 | −61 | −18% |
| outer tube (stainless steel) | 14.0 | 0.6 | 280 | 56 | | |
| dual-layer tube according to the present disclosure | | | | 281 | | |
| existing iron supporting rod | 14.0 | 1.6 | 700 | 342 | | |

Alternatively, after the inner tube 1 is enclosed by the outer tube 2, a notch may be processed on the outer side of the outer tube 2 to prevent the outer tube 2 from dropping. Meanwhile, the end portion of the outer tube 2 may be coupled to the inner tube 1 by a method such as brazing. Under an applied force, a displacement occurs between the outer tube 2 and the inner tube 1, with a moment smaller than the total plate thickness. By connecting the inner tube 1 at the end of the outer tube 2, it is possible to prevent sliding and ensure the strength.

In addition to brazing, the inner tube 1 and the outer tube 2 may also be joined by adhesion. Considering the properties of the product, laser brazing is the most suitable method, whereby the solvent enters a gap between the outer tube 2 and the inner tube 1 to connect the parts in one piece and prevent a decrease in the strength due to melting the inner tube 1 by brazing. Furthermore, if the inner tube 1 is subjected to anti-rusting treatment by galvanization and the like, the anti-rusting performance will not be harmed.

The present disclosure provides a double-layer structure of iron and stainless steel, and is tested at the following size (mm):

Inner tube: STKM15C, Φ12.7, t1.6
Outer tube: SUS304, Φ14.0, t0.6
Notch size: depth 1.95, straight length 0.95

After the inner tube of the above size is inserted into the outer tube, the outer tube is formed with a notch by compression such that a portion of the outer tube and a portion of the inner tube at this portion are both deformed, thereby preventing dropping. Subsequently, an anti-dropping strength is tested in a stretch test performed by clamping the inner tube at one end while clamping the outer tube at the other end. Only after the loaded force reaches about 200 kg, breakage occurs at the notch and the outer tube and the inner tube are separated from each other. It can be seen that the structure of the outer tube enclosing the inner tube has an adequate anti-dropping effect after the compression process.

The invention claimed is:

1. A headrest support, which has a U shape and which is configured for supporting a headrest, comprising:
   an inner tube; and
   an outer tube, covering at least two end portions of the inner tube,
   wherein the outer tube is secured to the inner tube by laser brazing, and
   a length of a welded portion of the laser brazing is set to a length enabling the headrest to bear a pressure from a head as being leaned against.

2. The headrest support according to claim 1, wherein the welded portion of the laser brazing is formed on each of the two end portions of the inner tube and an end portion or end portions of the outer tube.

3. The headrest support according to claim 1, wherein the inner tube has undergone galvanization.

4. The headrest support according to claim 3, wherein the inner tube is formed by iron, and the outer tube is formed by stainless steel.

5. The headrest support according to claim 1, wherein the headrest support is comprised of one inner tube and two outer tube covering two end portions of the inner tube, respectively.

6. A seat headrest, comprising a headrest portion and a headrest support, the headrest support having an embedded portion embedded in an interior of the headrest portion and an insertion portion exposed to an exterior of the headrest portion and to be inserted into a vehicular seat backrest, wherein
   the headrest support has a U shape and comprises an inner tube and an outer tube covering at least two end portions of the inner tube,
   wherein the outer tube is secured to the inner tube by laser brazing, and
   a length of a welded portion of the laser brazing is set to a length enabling the headrest to bear a pressure from a head as being leaned against.

7. The seat headrest according to claim 6, wherein the welded portion of the laser brazing is formed on each of the two end portions of the inner tube and an end portion or end portions of the outer tube.

8. The seat headrest according to claim 6, wherein the inner tube has undergone galvanization.

9. The seat headrest according to claim 8, wherein the inner tube is formed by iron, and the outer tube is formed by stainless steel.

10. The seat headrest according to claim 6, wherein the headrest support is comprised of one inner tube and two outer tube covering two end portions of the inner tube, respectively.

11. The seat headrest according to claim 6, wherein the insertion portion is completely enclosed by the outer tube.

* * * * *